(12) United States Patent
Iwaki et al.

(10) Patent No.: US 8,950,217 B2
(45) Date of Patent: Feb. 10, 2015

(54) METHOD OF CUTTING OBJECT TO BE PROCESSED, METHOD OF CUTTING STRENGTHENED GLASS SHEET AND METHOD OF MANUFACTURING STRENGTHENED GLASS MEMBER

(75) Inventors: Hiroyuki Iwaki, Hamamatsu (JP); Takafumi Ogiwara, Hamamatsu (JP); Takeshi Sakamoto, Hamamatsu (JP); Masaharu Hoshikawa, Hamamatsu (JP); Kazuhiro Atsumi, Hamamatsu (JP); Daisuke Kawaguchi, Hamamatsu (JP); Takafumi Tsunematsu, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 415 days.

(21) Appl. No.: 13/151,877

(22) Filed: Jun. 2, 2011

(65) Prior Publication Data

US 2011/0316200 A1 Dec. 29, 2011

Related U.S. Application Data

(63) Continuation-in-part of application No. 13/107,056, filed on May 13, 2011, now Pat. No. 8,816,245.

(30) Foreign Application Priority Data

May 14, 2010 (JP) ................................ P2010-112188

(51) Int. Cl.
*C03B 33/02* (2006.01)
*C03B 33/09* (2006.01)
(Continued)

(52) U.S. Cl.
CPC ......... *B23K 26/0057* (2013.01); *B23K 26/0639* (2013.01); *B23K 26/4075* (2013.01)
USPC ................................... 65/97; 65/112; 65/269

(58) Field of Classification Search
CPC ........... B23K 26/0054; B23K 26/0057; C03B 33/0222; C03B 33/09; C03B 33/091; C03B 33/093; C03B 33/102; C03B 33/02
USPC ........... 219/121.66, 121.69, 121.85; 264/400; 65/112, 269, 62, 97
See application file for complete search history.

(56) References Cited

U.S. PATENT DOCUMENTS

| | | | |
|---|---|---|---|
| 5,624,585 A | 4/1997 | Haruta et al. | |
| 6,211,488 B1 * | 4/2001 | Hoekstra et al. | 219/121.72 |

(Continued)

FOREIGN PATENT DOCUMENTS

| | | |
|---|---|---|
| JP | 2003-010991 | 1/2003 |
| JP | 2004-343008 | 12/2004 |

(Continued)

*Primary Examiner* — Samuel M Heinrich
(74) *Attorney, Agent, or Firm* — Drinker Biddle & Reath LLP

(57) ABSTRACT

A method of cutting an object to be processed comprises the steps of irradiating an object to be processed with a laser light which is an elliptically-polarized light having an ellipticity other than 1 such that a direction of polarization of the laser light intersects a line to cut the object and a thickness direction of the object, while locating a converging point of the laser light within the object, so as to form a modified region within the object along the line and generate a fracture from the modified region in the thickness direction of the object, and causing the fracture to reach front and rear faces of the object so as to cut the object along the line.

8 Claims, 16 Drawing Sheets

(51) Int. Cl.
  *B23K 26/00*  (2014.01)
  *B23K 26/06*  (2014.01)
  *B23K 26/40*  (2014.01)

(56)          References Cited

U.S. PATENT DOCUMENTS

| 6,992,026 | B2 | 1/2006 | Fukuyo et al. | |
| 7,396,742 | B2 * | 7/2008 | Fukuyo et al. | 438/463 |
| 2004/0002199 | A1 | 1/2004 | Fukuyo et al. | |
| 2005/0184037 | A1 | 8/2005 | Fukuyo et al. | |
| 2005/0202596 | A1 | 9/2005 | Fukuyo et al. | |
| 2005/0272223 | A1 | 12/2005 | Fujii et al. | |
| 2006/0011593 | A1 | 1/2006 | Fukuyo et al. | |
| 2006/0148212 | A1 | 7/2006 | Fukuyo et al. | |
| 2006/0255024 | A1 | 11/2006 | Fukuyo et al. | |
| 2007/0125757 | A1 | 6/2007 | Fukuyo et al. | |
| 2007/0158314 | A1 | 7/2007 | Fukumitsu et al. | |
| 2008/0030876 | A1 | 2/2008 | Kataoka et al. | |
| 2010/0210442 | A1 * | 8/2010 | Abramov et al. | 501/66 |

FOREIGN PATENT DOCUMENTS

| JP | 2006167810 | A | 6/2006 |
| JP | 2008098465 | A | 4/2008 |
| JP | 2009226457 | A | 10/2009 |

* cited by examiner

Fig. 10
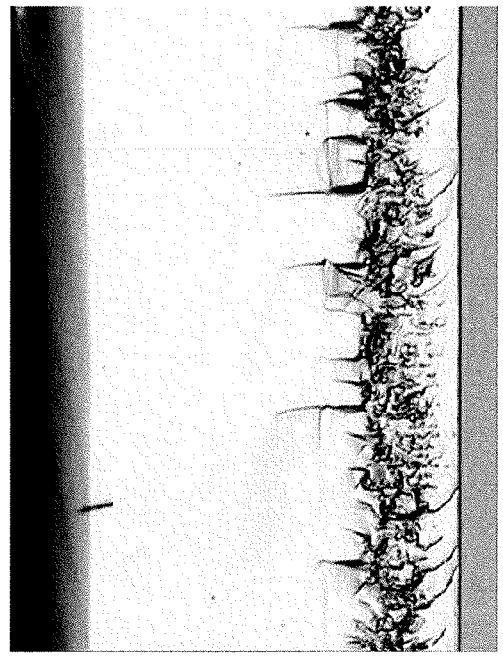

Fig. 11
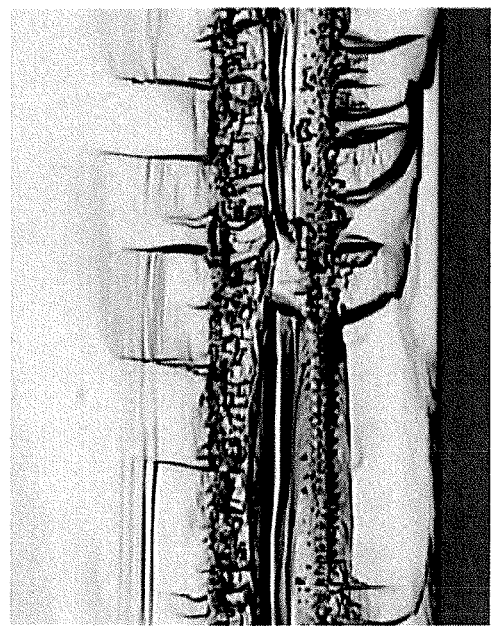
(b)
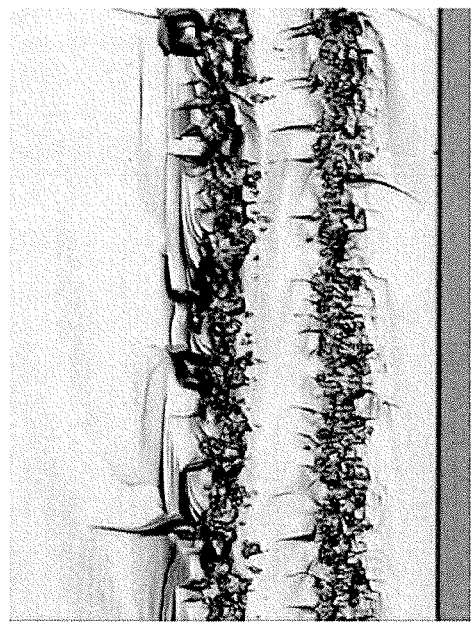
(a)

Fig.13
(a)
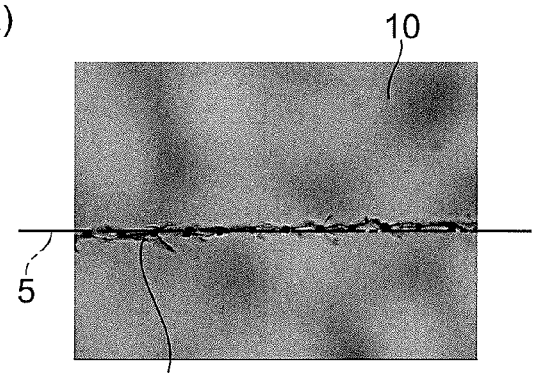
(b)
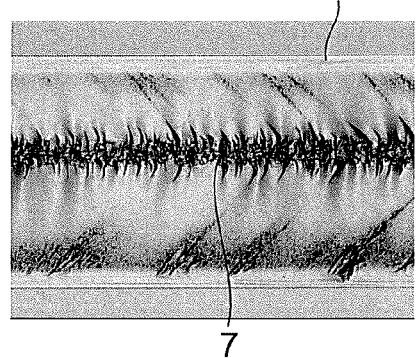
(c)
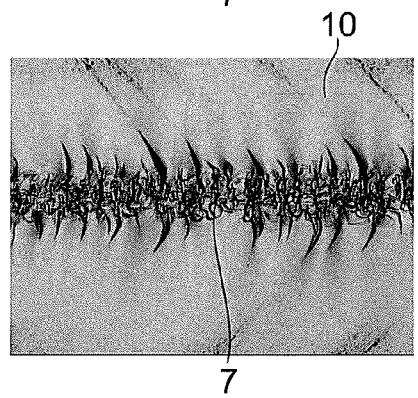
(d)
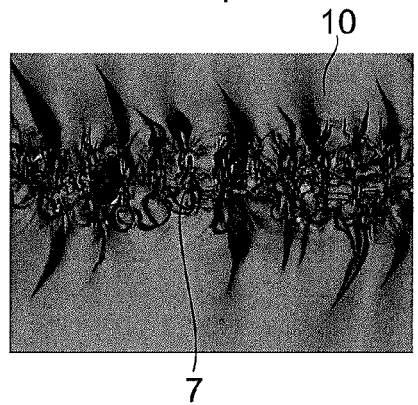

Fig.14
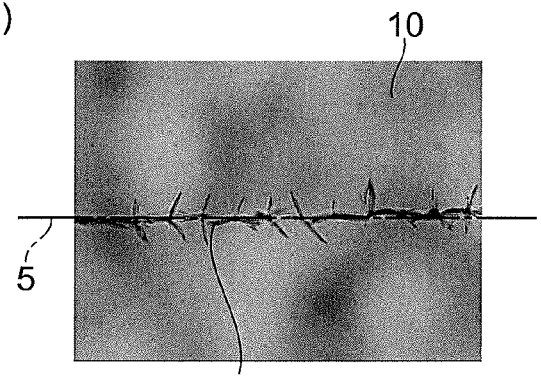
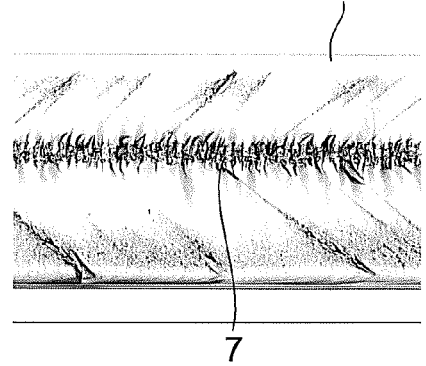
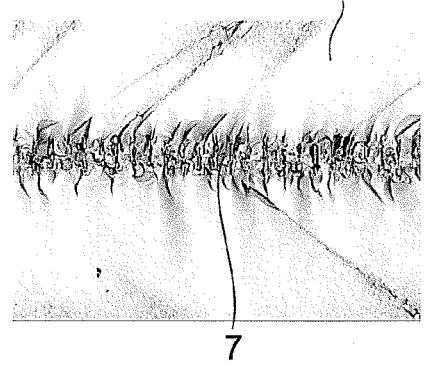

Fig.15
(a)
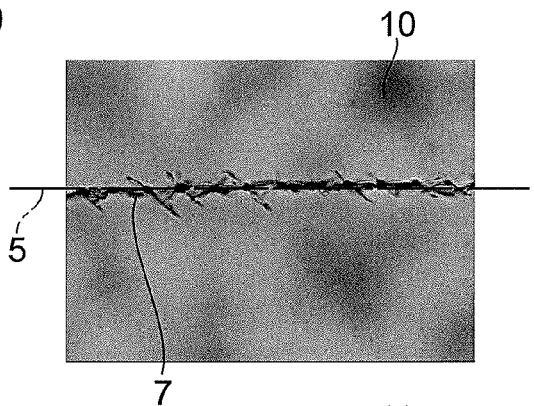
(b)
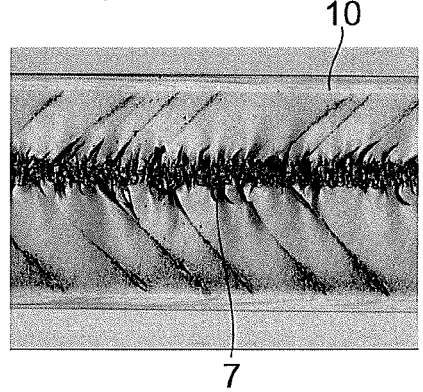
(c)
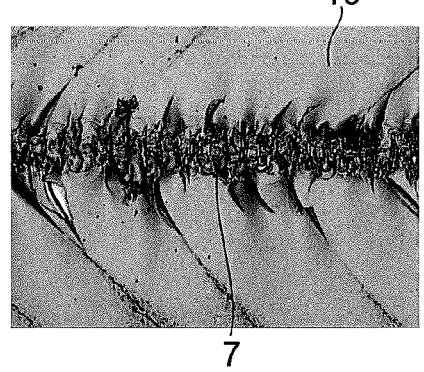
(d)
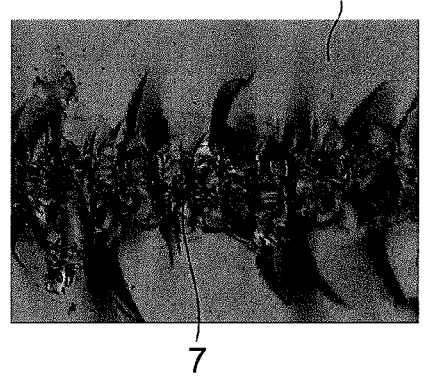

METHOD OF CUTTING OBJECT TO BE PROCESSED, METHOD OF CUTTING STRENGTHENED GLASS SHEET AND METHOD OF MANUFACTURING STRENGTHENED GLASS MEMBER

CROSS-REFERENCE TO RELATED APPLICATIONS

This is a Continuation-In-Part application of Ser. No. 13/107,056 filed on May 13, 2011 now U.S. Pat. No. 8,816,245 and claiming priority to Japanese Patent Application No. 2010-112188 filed on May 14, 2010, which are hereby incorporated by reference in their entirety.

BACKGROUND OF THE INVENTION

1. Field of the Invention

The present invention relates to a method of cutting a sheet-like object to be processed along a line to cut the object, a method of cutting a strengthened glass sheet along a line to cut the sheet and a method of manufacturing a strengthened glass member.

2. Related Background Art

Known as a conventional method of cutting an object to be processed is one which irradiates an object to be processed with a laser light so as to form a modified region within the object along a line to cut the object and cause fractures generated from the modified region to reach the front and rear faces of the object, thereby cutting the object along the line (see, for example, Japanese Patent Application Laid-Open No. 2004-343008).

SUMMARY OF THE INVENTION

Methods such as the one mentioned above may be able to shorten the takt time or improve the cutting quality if they can generate a fracture from a modified region when forming the modified region and extend the fracture in the thickness direction of the object. In the case where the object is a strengthened glass sheet, they have been demanded to improve the cutting quality along the line.

It is therefore an object of the present invention to provide a method of cutting an object to be processed, the method which can extend a fracture more from a modified region in the thickness direction of the object when forming the modified region, a method of cutting a strengthened glass sheet and a method of manufacturing a strengthened glass member, the methods which can improve the cutting quality along a line to cut the sheet.

In order to achieve the above-mentioned object, one aspect of the method of cutting an object to be processed in accordance with the present invention comprises the steps of irradiating an object to be processed with a laser light which is an elliptically-polarized light having an ellipticity other than 1 such that a direction of polarization of the laser light intersects a line to cut the object and a thickness direction of the object, while locating a converging point of the laser light within the object, so as to form a modified region within the object along the line and generate a fracture from the modified region in the thickness direction of the object; and causing the fracture to reach front and rear faces of the object so as to cut the object along the line.

When forming a modified region, this method irradiates an object to be processed with a laser light along a line to cut the object such that the direction of polarization of the laser light intersects the line and the thickness direction of the object.

The inventors conducted diligent studies and, as a result, have found that the fracture can extend more from the modified region in the thickness direction of the object when irradiated with the laser light in such a state than when irradiated with a laser light whose direction of polarization is parallel to the line, for example. Therefore, this method can extend fractures more from the modified region in the thickness direction of the object when forming the modified region.

The ellipticity of the elliptically-polarized light is (half the length of the minor axis)/(half the length of the major axis) in the ellipse representing the elliptically-polarized light. Therefore, an elliptically-polarized light with an ellipticity of 1 corresponds to a circularly-polarized light, while an elliptically-polarized light with an ellipticity of 0 corresponds to a linearly-polarized light. The direction of polarization of the laser light is the direction of the major axis of the ellipse representing the elliptically-polarized light. Hence, when the ellipticity is 0, the direction of polarization of the laser light is the direction of a line representing the linearly-polarized light.

A plurality of rows of modified regions may be formed so as to align in the thickness direction of the object for one of the line. Since fractures are easier to extend from the modified regions in the thickness direction of the object as mentioned above, even when the object is relatively thick, the number of modified regions to be formed for one of the line can be reduced, so as to shorten the takt time.

The object may be irradiated with the laser light along the line such that the direction of polarization of the laser light is orthogonal to the line and the thickness direction of the object. As the direction of polarization of the laser light is closer to the state orthogonal to the line and the thickness direction of the object, fractures are more inhibited from extending in directions other than the thickness direction of the object, whereby the fractures can accurately extend from the modified region in the thickness direction of the object.

The elliptically-polarized light may be a linearly-polarized light having an ellipticity of 0. As the ellipticity of the elliptically-polarized light is smaller, fractures are more inhibited from extending in directions other than the thickness direction of the object, whereby the fractures can accurately extend from the modified region in the thickness direction of the object.

One aspect of the method of cutting a strengthened glass sheet in accordance with the present invention comprises irradiating a strengthened glass sheet with a laser light which is an elliptically-polarized light having an ellipticity other than 1 such that a direction of polarization of the laser light intersects a line to cut the strengthened glass sheet and a thickness direction of the strengthened glass sheet, while locating a converging point of the laser light within the strengthened glass sheet, so as to form a modified region within the strengthened glass sheet along the line and cut the strengthened glass sheet along the line.

One aspect of the method of manufacturing a strengthened glass member having a predetermined form in accordance with the present invention comprising irradiating a strengthened glass sheet with a laser light which is an elliptically-polarized light having an ellipticity other than 1 such that a direction of polarization of the laser light intersects a line set along the predetermined form in the strengthened glass sheet and a thickness direction of the strengthened glass sheet, while locating a converging point of the laser light within the strengthened glass sheet, so as to form a modified region within the strengthened glass sheet along the line and cut the strengthened glass sheet along the line, thereby manufacturing the strengthened glass member.

These methods can improve the cutting quality along the line as compared with the case where the laser light is emitted such that the direction of polarization of the laser light is parallel to the line, for example.

The strengthened glass sheet may be irradiated with the laser light along the line such that the direction of polarization of the laser light is orthogonal to the line and the thickness direction of the strengthened glass sheet. As the direction of polarization of the laser light is closer to the state orthogonal to the line and the thickness direction of the strengthened glass sheet, the cutting quality along the line can be made higher.

The elliptically-polarized light may be linearly-polarized light having an ellipticity of 0. As the ellipticity of the elliptically-polarized light is smaller, the cutting quality along the line can be made higher.

BRIEF DESCRIPTION OF THE DRAWINGS

FIG. 10 is a view illustrating photographs of a cut surface of an object to be processed;

FIG. 11 is a view illustrating photographs of a cut surface of an object to be processed;

FIG. 13 is a view illustrating photographs of a strengthened glass sheet in which a modified region was formed in Example;

FIG. 14 is a view illustrating photographs of a strengthened glass sheet in which a modified region was formed in Comparative Example 1;

FIG. 15 is a view illustrating photographs of a strengthened glass sheet in which a modified region was formed in Comparative Example 2.

DESCRIPTION OF THE PREFERRED EMBODIMENTS

Figure 1:
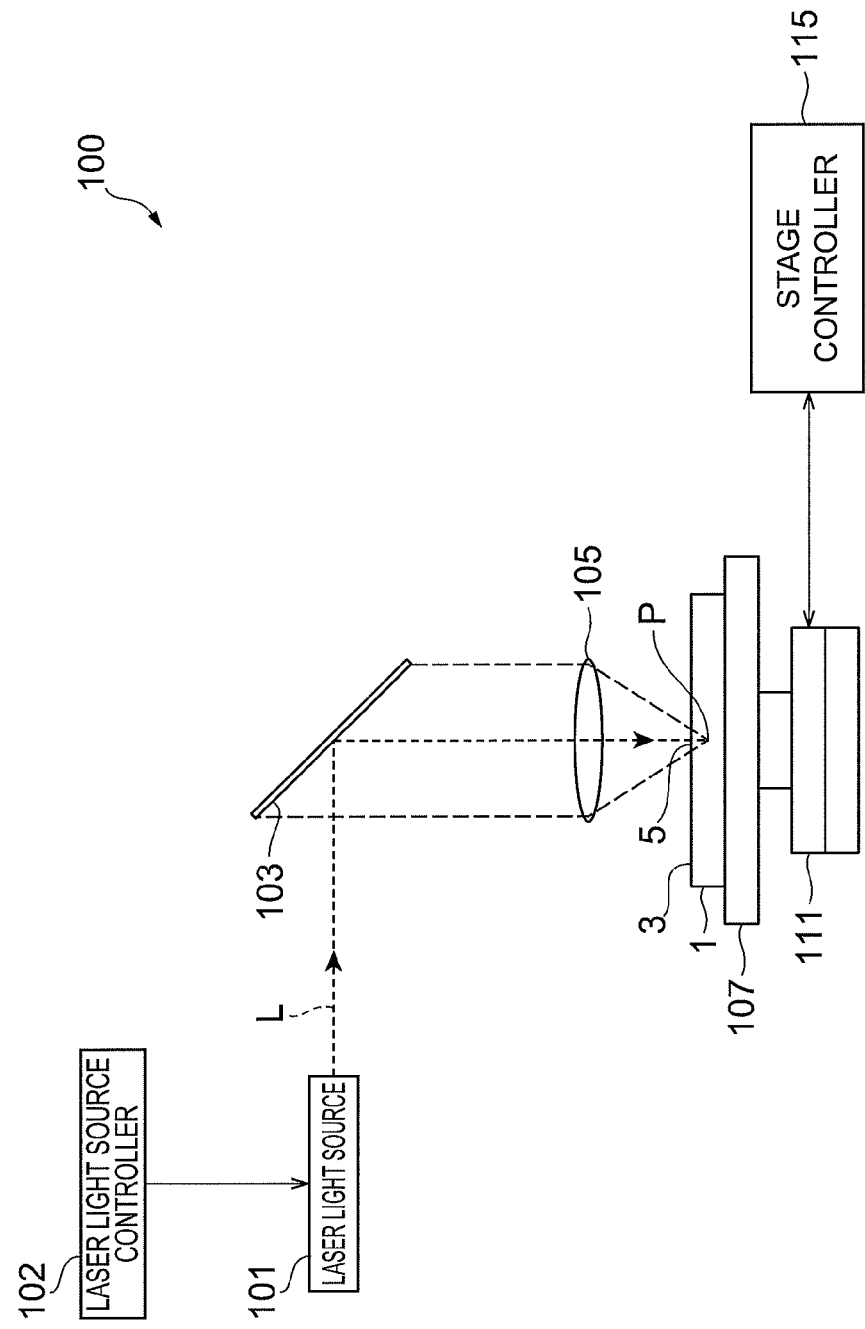
FIG. 1 is a schematic structural diagram of a laser processing device used for forming a modified region.

In the following, preferred embodiments of the present invention will be explained in detail with reference to the drawings. In the drawings, the same or equivalent parts will be referred to with the same signs while omitting their overlapping explanations.

In the method of cutting an object to be processed, the method of cutting a strengthened glass sheet and the method of manufacturing a strengthened glass member in accordance with embodiments of the present invention, an object to be processed is irradiated with a laser light along a line to cut the object, so as to form a modified region within the object along the line. Therefore, the forming of the modified region will firstly be explained with reference to FIGS. 1 to 6.

As illustrated in FIG. 1, a laser processing device 100 comprises a laser light source 101 which causes a laser light L to oscillate in a pulsating manner, a dichroic mirror 103 arranged such as to change the direction of the optical axis of the laser light L by 90°, and a condenser lens 105 for converging the laser light L. The laser processing device 100 also comprises a support table 107 for supporting an object to be processed 1 irradiated with the laser light L converged by the condenser lens 105, a stage 111 for moving the support table 107 along X, Y, and Z axes, a laser light source controller 102 for controlling the laser light source 101 in order to regulate the output, pulse width, and the like of the laser light L, and a stage controller 115 for controlling the movement of the stage 111.

In the laser processing device 100, the laser light L emitted from the laser light source 101 changes the direction of its optical axis by 90° with the dichroic mirror 103 and then is converged by the condenser lens 105 into the object 1 mounted on the support table 107. At the same time, the stage 111 is shifted, so that the object 1 moves relative to the laser light L along a line 5 to cut the object 1. This forms a modified region in the object 1 along the line 5.

Figure 2:
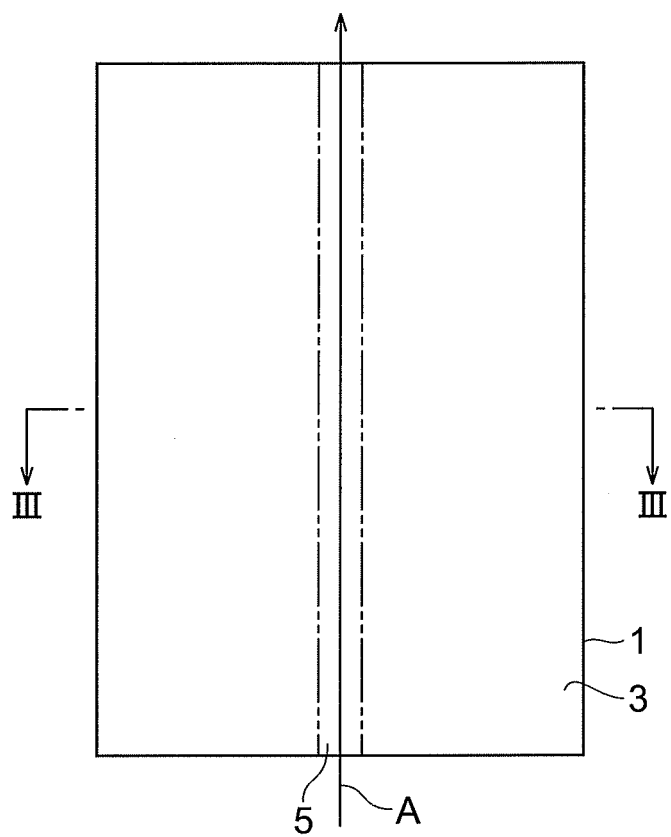
FIG. 2 is a plan view of an object to be processed in which the modified region is to be formed.
Figure 3:
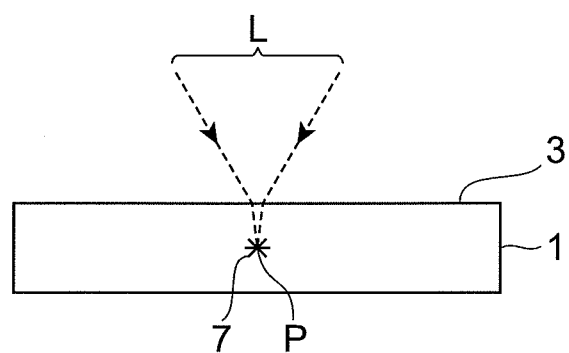
FIG. 3 is a sectional view of the object taken along the line III-III of FIG. 2.
Figure 4:
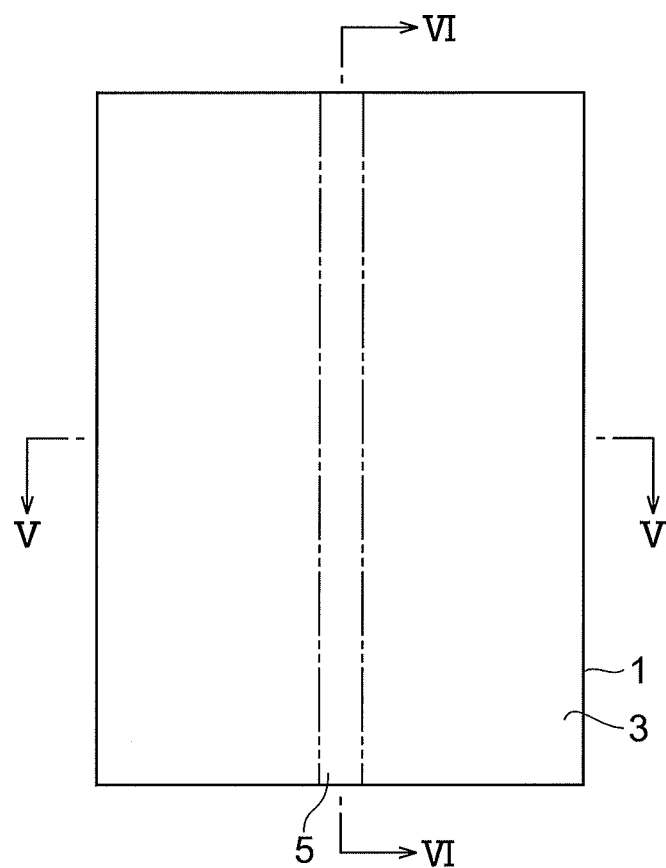
FIG. 4 is a plan view of the object after laser processing.
Figure 5:
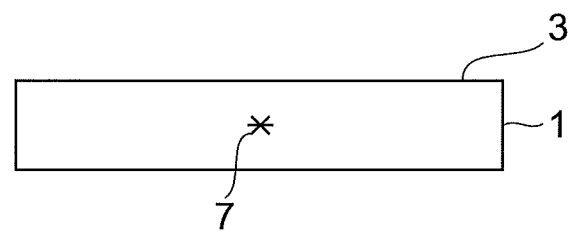
FIG. 5 is a sectional view of the object taken along the line V-V of FIG. 4.
Figure 6:
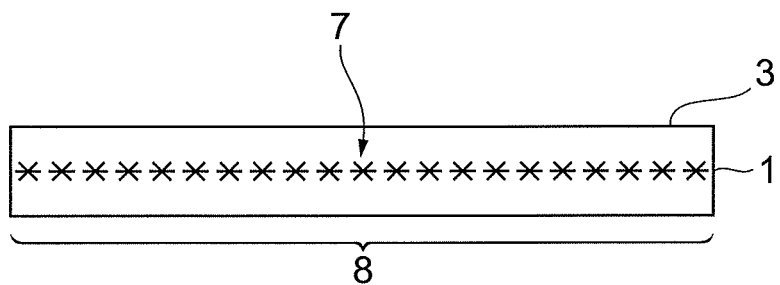
FIG. 6 is a sectional view of the object taken along the line VI-VI of FIG. 4.

The line 5 for cutting the object 1, for which a semiconductor material, a piezoelectric material, or the like is used, is set therein as illustrated in FIG. 2. The line 5 is a virtual line extending straight. When forming a modified region within the object 1, the laser light L is relatively moved along the line 5 (i.e., in the direction of arrow A in FIG. 2) while locating a converging point (converging position) P within the object 1 as illustrated in FIG. 3. This forms a modified region 7 within the object 1 along the line 5 as illustrated in FIGS. 4 to 6, whereby the modified region 7 formed along the line 5 becomes a cutting start region 8.

The converging point P is a position at which the laser light L is converged. The line 5 may be curved instead of being straight, and may be a line actually drawn on the front face 3 of the object 1 without being restricted to the virtual line. The modified region 7 may be formed either continuously or intermittently. The modified region 7 may be formed like lines or dots. It will be sufficient if the modified region 7 is formed at least within the object 1. There are cases where fractures are formed from the modified region 7 acting as a start point, and the fractures and modified region 7 may be exposed at outer surfaces (the front face, rear face, and outer peripheral face) of the object 1.

Here, the laser light L is absorbed in particular in the vicinity of the converging point within the object 1 while being transmitted therethrough, whereby the modified region 7 is formed in the object 1 (i.e., internal absorption type laser processing). Therefore, the front face 3 of the object 1 hardly absorbs the laser light L and thus does not melt. In the case of forming a removing part such as a hole or groove by melting it away from the front face 3, the processing region gradually progresses from the front face 3 side to the rear face side (i.e., surface absorption type laser processing) in general.

The modified region formed in the embodiments means regions whose physical characteristics such as density, refractive index, and mechanical strength have attained states different from those of their surroundings. Examples of the modified region include molten processed regions, crack regions, dielectric breakdown regions, refractive index changed regions, and their mixed regions. Further examples of the modified region include an area where the density of the modified region has changed from that of an unmodified region in a material of the object and an area formed with a lattice defect (which may collectively be referred to as a high-density transitional region).

The molten processed regions, refractive index changed regions, areas where the modified region has a density different from that of the unmodified region, or areas formed with a lattice defect may further incorporate a fracture (fracture or microcrack) therewithin or at an interface between the modified and unmodified regions. The incorporated fracture may be formed over the whole surface of the modified region or in only a part or a plurality of parts thereof. Examples of the object 1 include those containing or constituted by silicon, glass, $LiTaO_3$, or sapphire ($Al_2O_3$).

In these embodiments, a plurality of modified spots (processed marks) are formed along the line 5, so as to form the modified region 7. The modified spot is a modified part formed by a shot of one pulse of a pulsed laser light (i.e., irradiation with one pulse of a laser; laser shot). The modified spots gather to form the modified region 7. Examples of the modified spot include crack spots, molten processed spots, refractive index changed spots, and those mixed with at least one of them.

Preferably, the size of the modified spot and the length of fractures generated therefrom are controlled appropriately in view of the required cutting accuracy, the required flatness of the cut surface, the thickness, kind, crystal orientation, and the like of the object, and so forth.

Figure 7:
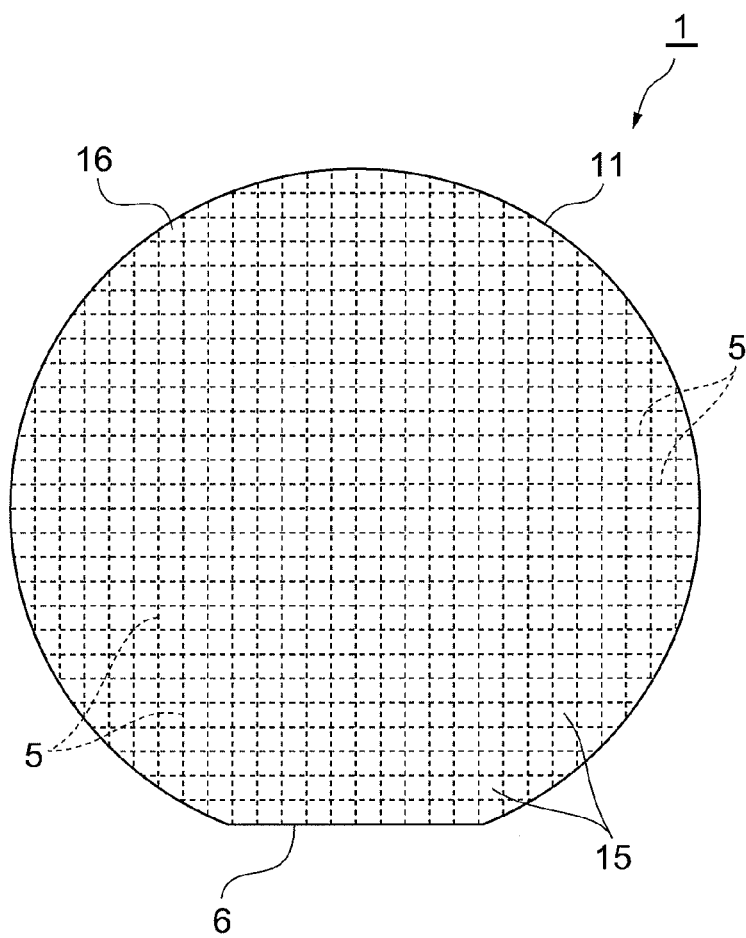
FIG. 7 is a plan view of an object to be processed to which the method of cutting an object to be processed in accordance with one embodiment of the present invention is applied.

The method in accordance with one embodiment of the present invention will now be explained in detail. FIG. 7 is a plan view of an object to be processed to which the method in accordance with one embodiment of the present invention is applied. As illustrated in FIG. 7, the object 1 is formed like a sheet comprising a silicon wafer 11 and a functional device layer 16 formed on the silicon wafer 11 while including a plurality of functional devices 15. A number of functional devices, examples of which include semiconductor operating layers formed by crystal growth, light-receiving devices such as photodiodes, light-emitting devices such as laser diodes, and circuit devices formed as circuits, are formed like a matrix in directions parallel and perpendicular to the orientation flat 6 of the silicon wafer 11.

Such an object to be processed 1 is cut along lines 5 set like grids so as to pass between adjacent functional devices. The lines 5 are set parallel to the front and rear faces of the object 1 and perpendicular to the thickness direction of the object 1.

Figure 8:
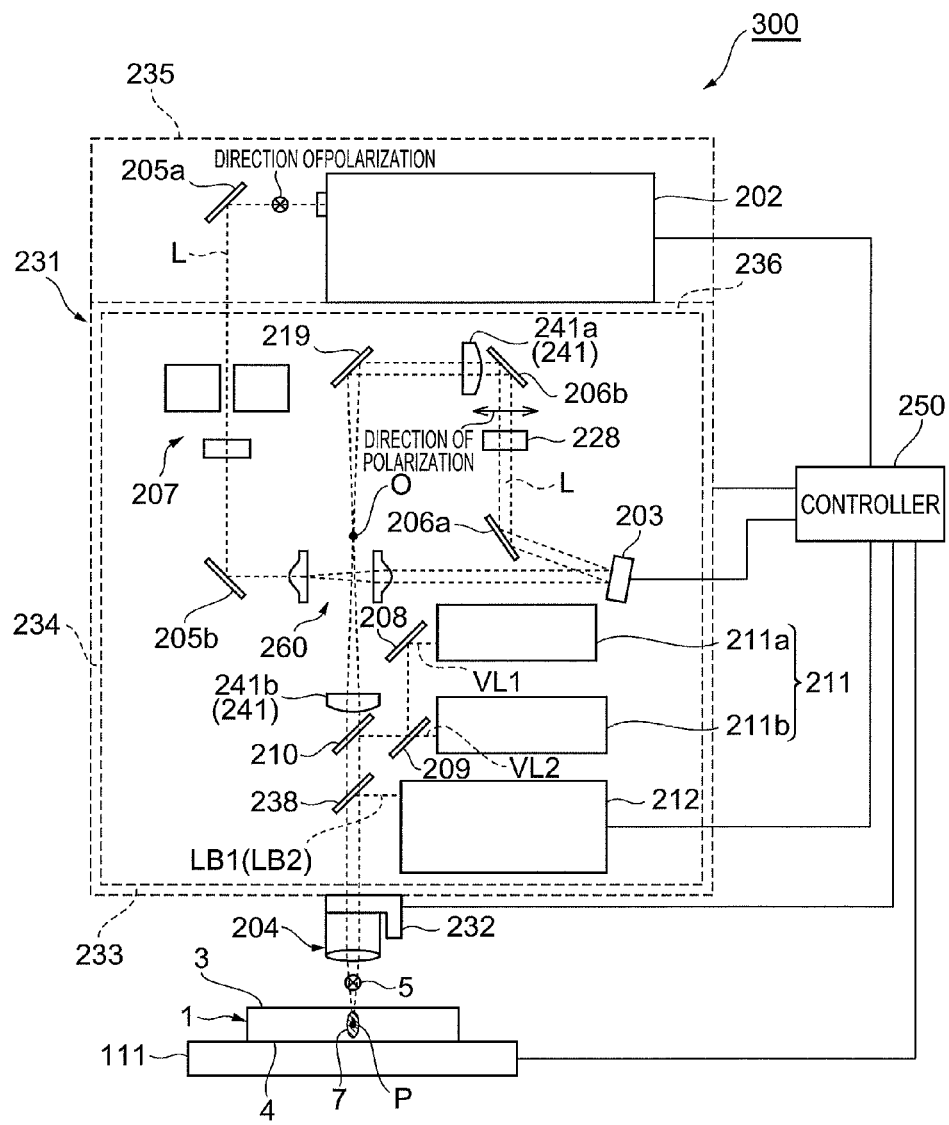
FIG. 8 is a schematic structural diagram of a laser processing device used in the method of cutting an object to be processed in accordance with the above-mentioned embodiment of the present invention.

FIG. 8 is a schematic structural diagram of a laser processing device used in the method of cutting a object to be processed in accordance with the embodiment of the present invention. As illustrated in FIG. 8, the laser processing device 300 comprises a laser light source 202, a reflective spatial light modulator 203, a 4f optical system 241, and a condenser optical system 204. The laser light source 202, reflective spatial light modulator 203, and 4f optical system 241 are arranged in a housing 231.

The laser light source 202, for which a fiber laser is used, for example, emits a laser light which is a pulsed laser light having a wavelength of 1064 nm, for example. The laser light L is emitted from the laser light source 202 as a linearly-polarized light (i.e., an elliptically-polarized light having an ellipticity of 0). Here, the laser light source 202 is secured to a top panel 236 of the housing 231 by screws and the like such as to emit the laser light L horizontally.

The reflective spatial light modulator 203, for which a spatial light modulator (SLM) made of a reflective liquid crystal (LCOS: Liquid Crystal on Silicon) is used, for example, modulates the laser light L emitted from the laser light source 202. Here, the reflective spatial light modulator 203 modulates the horizontally entering laser light L so as to correct the aberration at the converging point P of the laser light L converged into the object 1, while reflecting it obliquely upward with respect to the horizontal direction.

The 4f optical system 241 adjusts the wavefront form of the laser light L modulated by the reflective spatial light modulator 203. The 4f optical system 241 has a first lens 241a and a second lens 241b.

The lenses 241a, 241b are disposed between the reflective spatial light modulator 203 and the condenser optical system 204 such that the distance between the reflective spatial light modulator 203 and the first lens 241a becomes a focal length f1 of the first lens 241a, the distance between the condenser optical system 204 and the lens 241b becomes a focal length f2 of the lens 241b, the distance between the first and second lenses 241a, 241b becomes f1–f2, and the first and second lenses 241a, 241b form a double-sided telecentric optical system. This 4f optical system 241 can inhibit the laser light L modulated by the reflective spatial light modulator 203 from changing its wavefront form as it propagates through the space and increasing aberration.

The condenser optical system 204 converges the laser light L modulated by the 4f optical system 241 into the object 1. The condenser optical system 204 includes a plurality of lenses and is attached to a bottom panel 233 of the housing 231 through a drive unit 232 including a piezoelectric element or the like.

In the laser processing device 300, the laser light L emitted from the laser light source 202 horizontally advances within an enclosure 235 and then is reflected downward by a mirror 205a, whereby its optical intensity is adjusted by an attenuator 207. Thereafter, the laser light L is horizontally reflected by a mirror 205b and then, with its intensity distribution homogenized by a beam homogenizer 260, enters the reflective spatial light modulator 203.

The laser light L having entered the reflective spatial light modulator 203 is transmitted through a modulation pattern displayed in the liquid crystal layer of the reflective spatial light modulator 203, modulated according to the modulation pattern, and then emitted obliquely upward with respect to the horizontal direction. Subsequently, the laser light L is reflected upward by a mirror 206a and, with its direction of polarization adjusted by a half-wave plate 228, horizontally reflected by a mirror 206b, so as to enter the 4f optical system 241. Here, the half-wave plate 228 is insertable into and retractable from the optical path of the laser light L.

The laser light L having entered the 4f optical system 241 is converged through the first lens 241a, reflected downward by a mirror 219, diverged through a confocal point O, and transmitted through the second lens 241b, so as to be converged again into a parallel light. Thereafter, the laser light L is transmitted through dichroic mirrors 210, 218 in sequence, so as to enter the condenser optical system 204, and converged by the condenser optical system 204 into the object 1 mounted on the stage 111.

The laser processing device 300 also comprises a surface observation unit 211 for observing the front face 3 of the object 1 and an AF (AutoFocus) unit 212 for finely adjusting the distance between the condenser optical system 204 and the object 1 within the housing 231.

The surface observation unit 211 has an observation light source 211a for emitting a visible light VL1 and a detector 211b for receiving and detecting a reflected light VL2 of the visible light VL 1 reflected by the front face 3 of the object 1. In the surface observation unit 211, the visible light VL1 emitted from the observation light source 211a is reflected by a mirror 208 and dichroic mirrors 209, 210 and then transmitted through a dichroic mirror 238, so as to be converged by the condenser optical system 204 onto the object. The reflected light VL2 reflected by the front face 3 of the object 1 is converged by the condenser optical system 204, transmitted through the dichroic mirror 238, reflected by the dichroic mirror 210, and then transmitted through the dichroic mirror 209, so as to be received by the detector 211b.

The AF unit 212 emits an AF laser light LB1 and receives and detects a reflected light LB2 of the AF laser light LB1 reflected by the front face 3 of the object 1, thereby acquiring displacement data of the front face 3 (position (height) data of the front face 3 in the thickness direction of the object 1) along the lines 5. When forming the modified region 7, the AF unit 212 drives the drive unit 232 according to the acquired displacement data, so as to move the condenser optical system 204 back and forth in its optical axis direction along undulations of the front face 3 of the object 1.

The laser processing device 300 further comprises the controller 250 constituted by a CPU, a ROM, a RAM, and the like as one for controlling the laser processing device 300. The controller 250 controls the laser light source 202 and regulates the output, pulse width, and the like of the laser light L emitted from the laser light source 202. The controller 250 also controls the positions of the enclosure 231 and stage 111 and the driving of the drive unit 232 such that the converging point P of the laser light L is located at a predetermined distance from the front face 3 of the object 1 and relatively moves along the lines 5 when forming the modified region 7.

When forming the modified region 7, the controller 250 applies a predetermined voltage to the reflective spatial light modulator 203, so as to cause the liquid crystal layer of the reflective spatial light modulator 203 to display a predetermined modulation pattern. This can modulate the laser light L as desired. Predetermined modulation patterns have been derived beforehand according to the position at which the modified region 7 is to be formed, the wavelength of the laser light L to emit, and the refractive indexes of the condenser optical system 204 and workpiece 1, for example, and stored in the controller 250.

A case where the sheet-like workpiece 1 illustrated in FIG. 7 is processed by the laser processing device 300 illustrated in FIG. 8 will now be explained. First, the object 1 having an expandable tape attached to the rear face 4 thereof is mounted on the stage 111. Subsequently, the stage 111 and half-wave plate 228 are controlled such that the converging point P of the laser light L is located within the object 1 while the direction of polarization of the linearly polarized light L is orthogonal to the line 5 and the thickness direction of the object 1.

Specifically, as illustrated in FIG. 8, the stage 111 is controlled such that the converging point P of the laser light L is located at a predetermined distance inside from the front face 3 of the object 1. When the line 5 is parallel to the direction of polarization of the laser light L emitted from the laser light 202, the half-wave plate 228 is placed on the optical path of the laser light L. When the line 5 is perpendicular to the direction of polarization of the laser light L emitted from the laser light 202, on the other hand, the half-wave plate 228 is removed from the optical path of the laser light L. As a consequence, the direction of polarization of the laser light L emitted to the object 1 becomes orthogonal to the line 5.

Subsequently, the object 1 is irradiated with the laser light L along the line 5 such that the direction of polarization of the linearly polarized light L is orthogonal to the line 5 and the thickness direction of the object 1, while using the front face 3 of the object 1 as a laser entrance surface and locating the converging point P of the laser light within the object 1. That is, the converging point P of the laser light L is moved (scanned) relative to the object 1 along the lines 5. Here, the stage 111 is controlled so as to move the object 1.

Figure 9:
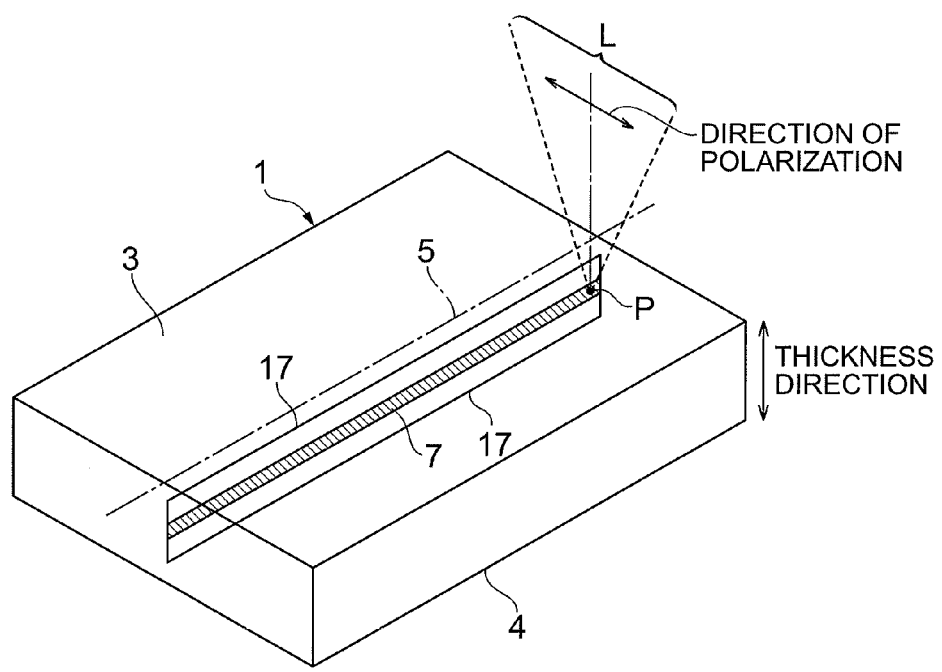
FIG. 9 is a conceptual view of the object subjected to the method of cutting an object to be processed in accordance with the above-mentioned embodiment of the present invention.

As illustrated in FIG. 9, the irradiation with the laser light L forms the modified region 7 within the object 1 along the line 5 and generate fractures 17 from the modified region 7 toward the front and rear faces 3, 4 of the object 1, respectively. Subsequently, the expandable tape attached to the rear face 4 of the object 1 is expanded, so as to let the fractures 17 reach the front and rear faces 3, 4 of the object 1, thereby cutting the object 1 along the line 5 and yielding a plurality of chips each having a functional device 15.

When forming the modified region 7 within the object 1, as explained in the foregoing, the object 1 is irradiated with the laser light L along the line 5 such that the direction of polarization of the laser light L which is a linearly-polarized light is orthogonal to the line 5 and the thickness direction of the object 1, while locating the converging point P of the laser light L within the object 1. The irradiation with the laser light L in such a state can extend the fractures 17 more from the modified region 7 in the thickness direction of the object 1 than the irradiation with the laser light L whose direction of polarization is parallel to the line 5, for example, even without any external force acting on the object 1.

The object 1 is irradiated with the laser light L which is a linearly-polarized light along the line 5 such that the direction of polarization is orthogonal to the line 5 and the thickness direction of the object 1. As a consequence, the fractures 17 can be extended accurately from the modified region 7 in the thickness direction of the object 1. This is because the fractures 17 are inhibited more from advancing to directions other than the thickness direction of the object 1 as the direction of polarization is closer to the state orthogonal to the line 5 and the thickness direction of the object 1 and as the ellipticity of the elliptically-polarized light is smaller (i.e., the polarization is closer to the linearly-polarized light).

Thus, as the modified region 7 is being formed (even without any external force acting on the object 1), long fractures 17 extend accurately from the modified region 7 in the thickness direction of the object 1, thereby making it possible to shorten the takt time and improve the cutting quality.

Results of experiments concerning the method of cutting a object to be processed in accordance with one embodiment of the present invention will now be explained. As illustrated in Table 1, a silicon wafer having a thickness of 608 μm was irradiated with a laser light along a line to cut the wafer with respective distances d1 from the front face (laser light entrance surface) of the silicon wafer to the position of the converging point of the laser light, so as to form modified regions within the silicon wafer along the line. Here, the laser light irradiation was performed under conditions with a laser wavelength of 1064 nm, a laser output of 1.4 W, a laser light scanning speed (stage moving speed) of 300 mm/s, and a pulse width of 150 ns.

In Table 1, the "perpendicular" direction of polarization indicates a case where the direction of polarization of the laser light which is a linearly-polarized light is perpendicular to the line and the thickness direction of the silicon wafer. On the other hand, the "parallel" direction of polarization indicates a case where the direction of polarization of the laser light which is a linearly-polarized light is parallel to the line and perpendicular to the thickness direction of the silicon wafer. The distance d2 is the distance from the rear-side end part of the modified region formed within the silicon wafer to the rear face of the silicon wafer.

As a result, in the case of the "perpendicular" direction of polarization, fractures were seen to have reached the rear face of the silicon wafer when the distance d1 was 605 μm, 600 μm, and 596 μm. In the case of the "parallel" direction of polarization, however, no fractures were seen to have reached the rear face of the silicon wafer regardless of the distance d1. This has verified that fractures can extend more from modified regions in the thickness direction of the silicon wafer in the case of the perpendicular direction of polarization than in the case of the parallel direction of polarization.

TABLE 1

| Distance d1 (μm) | Distance d2 (μm) | Direction of polarization | |
|---|---|---|---|
| | | Perpendicular | Parallel |
| 605 | 3 | Fracture | No fracture |
| 600 | 8 | Fracture | No fracture |
| 596 | 12 | Fracture | No fracture |
| 592 | 16 | No fracture | No fracture |

FIG. 10 represents photographs of a cut surface of a silicon wafer when one row of modified region (distance d2=8 μm) was formed within the silicon wafer (distance d1=600 μm) along a s line to cut the wafer, in which (a) indicates the case of the "perpendicular" direction of polarization, while (b) indicates the case of the "parallel" direction of polarization. FIG. 11 represents photographs of a cut surface of a silicon wafer when two rows of modified regions (distance d2=25 μm and 70 μm) were formed within the silicon wafer (distance d1=583 μm and 538 μm) along a line to cut the wafer, in which (a) indicates the case of the "perpendicular" direction of polarization, while (b) indicates the case of the "parallel" direction of polarization. These have verified that the case of the perpendicular direction of polarization of the laser light yields smoother cut surfaces, i.e., extends fractures more accurately from the modified regions in the thickness direction of the silicon wafer, than in the case of the parallel direction of polarization of the laser light.

Figure 12:
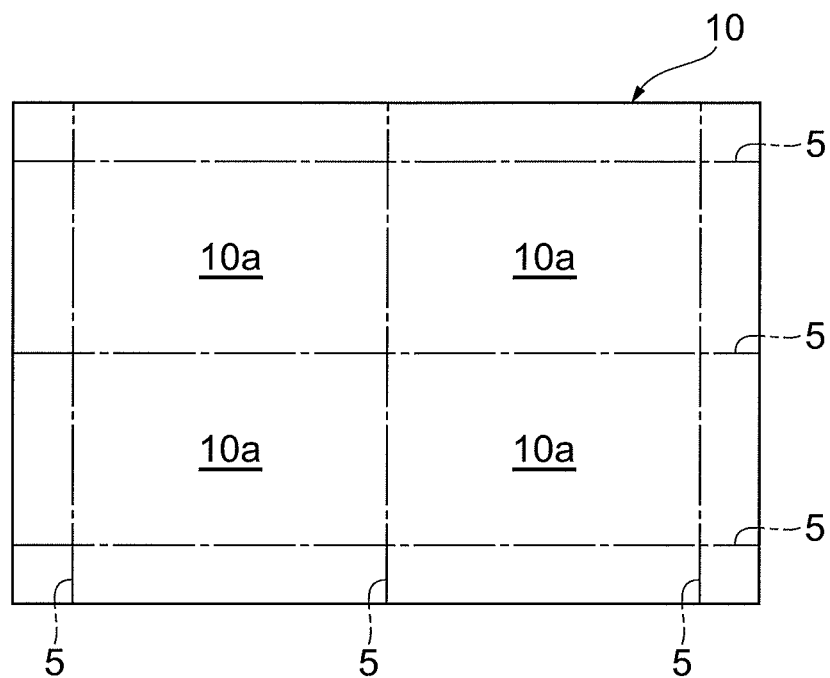
FIG. 12 is a plan view of a strengthened glass sheet to be processed by the method of cutting a strengthened glass sheet and the method of manufacturing a strengthened glass member in accordance with one embodiment of the present invention.

The method of cutting a strengthened glass sheet and the method of manufacturing a strengthened glass member in accordance with one embodiment of the present invention will now be explained in detail. FIG. 12 is a plan view of a strengthened glass sheet to be processed by the method of cutting a strengthened glass sheet and the method of manufacturing a strengthened glass member in accordance with one embodiment of the present invention. As illustrated in FIG. 12, a strengthened glass sheet 10 having a rectangular sheet form, for example, is prepared. The strengthened glass sheet 10 is a matrix for cutting out a plurality of strengthened glass members 10a each having a rectangular sheet form, for example. The strengthened glass members 10a are used for protective substrates of displays of mobile terminals, for example.

The strengthened glass is glass having a tensile stress layer and compressive stress layers formed on both sides of the tensile stress layer. The strengthened glass is manufactured by immersing normal glass (float glass) in a molten salt, so as to form the compressive stress layers on surface layers of the glass by ion exchange (ion-exchange method) or heating normal glass and then rapidly cooling the same by blowing air on the surface of the glass (air quenching method). In the strengthened glass sheet 10 and strengthened glass members 10a, their thickness direction coincides with the direction in which the tensile stress layer and compressive stress layers align.

The prepared strengthened glass sheet 10 is mounted on the stage 111 of the laser processing device 300. Subsequently, lines 5 are set for the strengthened glass sheet 10 along predetermined forms arranged by a plurality of rows and a plurality of columns. Here, the predetermined forms are forms of the sheet-like strengthened glass members 10a to be cut out from the strengthened glass sheet 10 when seen in their thickness direction.

The strengthened glass sheet 10 is irradiated with the laser light L along the lines 5 such that the direction of polarization of the linearly polarized light L is orthogonal to the lines 5 and the thickness direction of the strengthened glass sheet 10, while locating the converging point P of the laser light L within the strengthened glass sheet 10, so as to form the modified region 7 within the strengthened glass sheet 10 along the lines 5. Here, a crack region, a molten processed region, or their mixed area may be formed as the modified region 7.

Subsequently, an external force is applied along the lines 5, so that fractures generated from the modified region reach the front and rear faces of the strengthened glass sheet 10, thereby cutting the strengthened glass sheet 10 along the lines 5, thus yielding a plurality of strengthened glass members 10a.

When forming the modified region 7 within the strengthened glass sheet 10, as explained in the foregoing, the strengthened glass sheet 10 is irradiated with the laser light L along the lines 5 such that the direction of polarization of the linearly polarized light L is orthogonal to the lines 5 and the thickness direction of the strengthened glass sheet 10, while locating the converging point P of the laser light L within the strengthened glass sheet 10. The irradiation with the laser light L in such a state can improve the cutting quality along the lines 5 as compared with the case of irradiation with the laser light L whose direction of polarization is parallel to the lines 5, for example.

Here, the strengthened glass sheet 10 is irradiated with the linearly polarized light L along the lines 5 such that the direction of polarization is orthogonal to the lines 5 and the thickness direction of the strengthened glass sheet 10. This is because the cutting quality along the lines 5 improves more as the direction of polarization is closer to the state orthogonal to the line 5 and the thickness direction of the object 1 and as the ellipticity of the elliptically-polarized light is smaller (i.e., the polarization is closer to the linearly-polarized light).

When the object is a strengthened glass sheet, even without any external force acting on the strengthened glass sheet, fractures generated from the modified region may reach the front and rear faces of the strengthened glass sheet at the same time with or after a lapse of time from the completion of the modified region for the modified region, thereby finishing the cutting of the strengthened glass sheet along the lines.

Results of experiments concerning the method of cutting a strengthened glass sheet and the method of manufacturing a strengthened glass member in accordance with one embodiment of the present invention will now be explained. A strengthened glass sheet having a thickness of 550 μm was prepared and irradiated with a laser light along a line to cut the sheet, while the distance from the front face (laser light entrance surface) of the strengthened glass sheet to the converging point of the laser light was about 250 μm, so as to form one row of modified region within the strengthened glass sheet along the line. Here, the laser light irradiation was performed under conditions with a wavelength of 532 nm, a pulse width of about 500 ps, an energy of 15 µJ, and a pulse pitch (=(the relative moving speed of the converging point along the line=300 mm/s)/(the repetition frequency of the laser light=15 kHz)) of 20 µm. Preferably, the pulse pitch is 10 µm or more when the object is a strengthened glass sheet.

First, as illustrated in FIG. 13, the strengthened glass sheet 10 was irradiated with a laser light which is a linearly-polarized light along the line 5 such that the direction of polarization was perpendicular to the line 5 and the thickness direction of the strengthened glass sheet 10 (Example), whereby fractures generated from the modified region 7 mainly extended in the thickness direction of the strengthened glass sheet 10 along the line 7. In FIG. 13, (a) is a plan photograph of the strengthened glass sheet 10, while (b), (c), and (d) are photographs of a cut surface of the strengthened glass sheet 10 in ascending order of magnification (ditto in FIGS. 14 and 15 which will follow).

When the strengthened glass sheet 10 was irradiated with a laser light which is a linearly-polarized light along the line 5 such that the direction of polarization was parallel to the line 5 (Comparative Example 1), on the other hand, fractures generated from the modified region 7 also extended in directions perpendicular to the thickness direction of the strengthened glass sheet 10 as illustrated in FIG. 14. When the strengthened glass sheet 10 was irradiated with a laser light which is a circularly-polarized light along the line 5 (Comparative Example 2), fractures generated from the modified region 7 extended all around (randomly) as illustrated in FIG. 15.

Though embodiments of the present invention have been explained in the foregoing, the present invention is not limited thereto. For example, the laser light L is not limited to a linearly-polarized light, but may be an elliptically-polarized light having an ellipticity other than 1. The state of the laser light L at the time when irradiating the object 1 (including the strengthened glass sheet 10; ditto in the following) is not limited to the state where the direction of polarization of the laser light is orthogonal to the lines 5 and the thickness direction of the object 1 as long as the direction of polarization of the laser light intersects the lines 5 and the thickness direction of the object 1. When the object 1 is irradiated with the laser light L along the lines 5 such that the direction of polarization of the laser light L intersects the lines 5 and the thickness direction of the object 1, while locating the converging point P of the laser light L within the object 1, the fractures can be extended more from the modified region 7 in the thickness direction of the object 1 than when irradiated with the laser light L such that the direction of polarization of the laser light L is parallel to the lines 5, for example.

Figure 16:
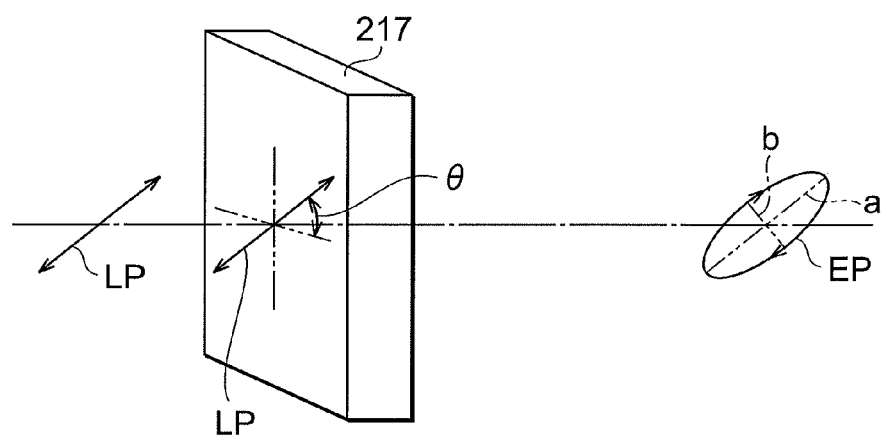
FIG. 16 is a conceptual diagram of a quarter-wave plate illustrating its principle.

When the laser processing device 300 is mounted with a quarter-wave plate 217 as illustrated in FIG. 16, the ellipticity of the elliptically-polarized light can be adjusted by changing the azimuth θ of the quarter-wave plate 217. That is, when a incident light which is a linearly-polarized light LP is incident on the quarter-wave plate 217, for example, the transmitted light become an elliptically-polarized light EP with a predetermined ellipticity ((half the length b of the minor axis)/(half the length a of the major axis) in the ellipse representing the elliptically-polarized light). When irradiating the object 1 with the laser light L having the linearly-polarized light LP, the laser light L emitted from the laser light source 202 has the linearly-polarized light LP, whereby it will be sufficient if the azimuth θ is adjusted such that the laser light L passes through the quarter-wave plate 217 while keeping the linearly-polarized light LP.

The number of rows of modified regions 7 formed such as to align in the thickness direction of the object 1 for one line 5 is not limited to 1, but there may be a plurality of rows. The number of rows can be determined appropriately according to the thickness of the object 1 and the like. Since the fractures 17 are easier to extend from the modified region 7 in the thickness direction of the object 1, even when the object 1 is relatively thick, the number of rows of modified regions 7 to be formed with respect to one line 5 can be reduced, so as to shorten the takt time.

Though the above-mentioned embodiments expand the expandable tape and so forth, so as to apply an external force to the object 1, thereby letting the fractures 17 reach the front and rear faces 3, 4 of the fractures 17, this is not restrictive. The fractures 17 may reach the front and rear faces 3, 4 of the fractures 17 simultaneously with the forming of one or a plurality of rows of modified regions 7 for one line 5 (without applying any external force to the object 1), thereby cutting the object 1 along the lines 5.

The lines 5 are not limited to straight ones, but may be curved like a circle or ellipse in at least a part thereof. When irradiating the object 1 with the laser light L along the curved part of the line 5, the direction of polarization of the laser light L may be controlled so as to intersect (more preferably be orthogonal to) the tangential direction of the curve and the thickness direction of the object 1. To achieve this, it is sufficient for the above-mentioned laser processing device 300 to rotate the half-wave plate 228 according to the tangential directions of the lines 5.

What is claimed is:

1. A method of cutting a strengthened glass sheet, comprising:
    irradiating a strengthened glass sheet with a laser light which is an elliptically-polarized light having an ellipticity other than 1 such that a direction of polarization of the laser light intersects a line to cut the strengthened glass sheet and a thickness direction of the strengthened glass sheet, while locating a converging point of the laser light within the strengthened glass sheet, so as to form a modified region within the strengthened glass sheet along the line, simultaneously generating a fracture from the modified region in the thickness direction of the strengthened glass sheet and cutting the strengthened glass sheet along the line.

2. A method of cutting a strengthened glass sheet according to claim 1, wherein the strengthened glass sheet is irradiated with the laser light along the line such that the direction of polarization of the laser light is orthogonal to the line and the thickness direction of the strengthened glass sheet.

3. A method of cutting a strengthened glass sheet according to claim 1, wherein the elliptically-polarized light is a linearly-polarized light having an ellipticity of 0.

4. A method of cutting a strengthened glass sheet according to claim 2, wherein the elliptically-polarized light is a linearly-polarized light having an ellipticity of 0.

5. A method of manufacturing a strengthened glass member having a predetermined form, comprising:
    irradiating a strengthened glass sheet with a laser light which is an elliptically-polarized light having an ellipticity other than 1 such that a direction of polarization of the laser light intersects a line set along the predetermined form in the strengthened glass sheet and a thickness direction of the strengthened glass sheet, while locating a converging point of the laser light within the strengthened glass sheet, so as to form a modified region within the strengthened glass sheet along the line, simultaneously generating a fracture from the modified region in the thickness direction of the strengthened glass sheet and cutting the strengthened glass sheet along the line, to manufacture the strengthened glass member.

6. A method of manufacturing a strengthened glass member according to claim 5, wherein the strengthened glass sheet is irradiated with the laser light along the line such that the direction of polarization of the laser light is orthogonal to the line and the thickness direction of the strengthened glass sheet.

7. A method of manufacturing a strengthened glass member according to claim 5, wherein the elliptically-polarized light is a linearly-polarized light having an ellipticity of 0.

8. A method of manufacturing a strengthened glass member according to claim 6, wherein the elliptically-polarized light is a linearly-polarized light having an ellipticity of 0.

* * * * *